United States Patent
Aruga (10) Patent No.: US 10,400,079 B2
(45) Date of Patent: Sep. 3, 2019

(54) FLUORINATED RESIN COMPOSITION AND LAMINATE

(71) Applicant: AGC Inc., Chiyoda-ku (JP)

(72) Inventor: Hiroshi Aruga, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 136 days.

(21) Appl. No.: 15/277,403

(22) Filed: Sep. 27, 2016

(65) Prior Publication Data

US 2017/0015848 A1    Jan. 19, 2017

Related U.S. Application Data (63) Continuation of application No. PCT/JP2015/059979, filed on Mar. 30, 2015.

(30) Foreign Application Priority Data

Mar. 31, 2014 (JP) ................. 2014-071593

(51) Int. Cl.

| | | |
|---|---|---|
| C08J 7/04 | (2006.01) | |
| B32B 27/20 | (2006.01) | |
| C09D 201/04 | (2006.01) | |
| B32B 27/30 | (2006.01) | |
| B32B 27/32 | (2006.01) | |
| B32B 3/10 | (2006.01) | |
| C08J 7/06 | (2006.01) | |
| C08K 3/08 | (2006.01) | |
| C08K 9/02 | (2006.01) | |
| C09D 5/33 | (2006.01) | |
| C09D 127/18 | (2006.01) | |
| C09D 7/40 | (2018.01) | |
| C09D 7/62 | (2018.01) | |

(52) U.S. Cl.
CPC ................. *C08J 7/047* (2013.01); *B32B 3/10* (2013.01); *B32B 27/20* (2013.01); *B32B 27/308* (2013.01); *B32B 27/322* (2013.01); *C08J 7/06* (2013.01); *C08K 3/08* (2013.01); *C08K 9/02* (2013.01); *C09D 5/004* (2013.01); *C09D 7/40* (2018.01); *C09D 7/62* (2018.01); *C09D 127/18* (2013.01); *C09D 201/04* (2013.01); *B32B 2264/102* (2013.01); *B32B 2307/306* (2013.01); *B32B 2307/7265* (2013.01); *B32B 2307/75* (2013.01); *B32B 2419/00* (2013.01); *C08J 2327/12* (2013.01); *C08J 2327/18* (2013.01); *C08J 2427/12* (2013.01); *C08J 2427/18* (2013.01); *C08J 2427/20* (2013.01); *C08K 2003/0812* (2013.01)

(58) Field of Classification Search
CPC . C09D 7/62; C09D 7/40; C09D 5/004; C09D 127/18; C09D 201/04; C08K 9/02; C08K 3/08; C08K 2003/0812; C08J 7/06; C08J 7/047; C08J 2427/12; C08J 2427/20; C08J 2427/18; C08J 2327/12; C08J 2327/18; B32B 27/308; B32B 27/322; B32B 27/20; B32B 3/10; B32B 2264/102; B32B 2307/306; B32B 2307/7265; B32B 2307/75; B32B 2419/00
See application file for complete search history.

(56) References Cited

U.S. PATENT DOCUMENTS

| | | | |
|---|---|---|---|
| 4,750,940 A | 6/1988 | Higashi et al. | |
| 2001/0031817 A1* | 10/2001 | Hashizume | C09D 5/032 524/439 |
| 2008/0087187 A1* | 4/2008 | Maul | C09C 1/644 106/14.44 |
| 2010/0083875 A1* | 4/2010 | Nakao | B22F 1/0062 106/404 |

FOREIGN PATENT DOCUMENTS

| | | | |
|---|---|---|---|
| JP | 58-141248 | | 8/1983 |
| JP | 62-164767 | | 7/1987 |
| JP | 62164767 | * | 7/1987 |
| JP | 62-253668 | | 11/1987 |
| JP | 4-45544 | | 7/1992 |
| JP | 8-259731 | | 10/1996 |
| JP | 11-279434 | | 10/1999 |
| JP | 2001-329226 | | 11/2001 |
| JP | 2002-88274 | | 3/2002 |
| JP | 2006-152061 | | 6/2006 |
| JP | 2006152061 | * | 6/2006 |
| JP | 4620239 | | 1/2011 |
| JP | 4633239 | | 2/2011 |

OTHER PUBLICATIONS

International Search Report dated Jun. 16, 2015 in PCT/JP2015/059979, filed on Mar. 30, 2015.

* cited by examiner

*Primary Examiner* — Robert S Jones
(74) *Attorney, Agent, or Firm* — Oblon, McClelland, Maier & Neustadt, L.L.P.

(57) ABSTRACT

To provide a fluorinated resin composition which is capable of forming a resin film excellent in moist heat resistance and solar reflectance. The fluorinated resin composition comprises composite particles, a fluorinated polymer and a liquid medium, wherein the composite particles are a composite having a part or whole of the surface of aluminum particles coated with at least one member selected from the group consisting of an acrylic resin and silica; the total coating amount of the acrylic resin and silica is from 6 to 25 parts by mass per 100 parts by mass of the aluminum particles; and the water surface diffusion area is from 14,000 to 27,000 cm²/g.

20 Claims, 1 Drawing Sheet

FLUORINATED RESIN COMPOSITION AND LAMINATE

TECHNICAL FIELD

The present invention relates to a fluorinated resin composition and a laminate obtained by using it.

BACKGROUND ART

A fluorinated resin film is excellent in weather resistance, stain resistance, etc. and thus is used, for example, as roofing material, wall covering material, etc. of a building or construction, such as an outdoor exhibition hall, a sports facility, an agriculture house, etc. (a building or construction using a fluorinated resin film as roofing material, wall covering material, etc., will be hereinafter referred to also as a "film structure building"). However, the fluorinated resin film has high solar transmittance, and when it is used as roofing material, wall covering, etc., the inside tends to be too bright, or the inside temperature tends to be too high. Therefore, it is desired to increase the solar reflectance.

A method for increasing the solar reflectance of a fluorinated resin film may, for example, be a method of kneading a reflective pigment such as mica coated with titanium oxide, titanium oxide, aluminum flake, etc. in the fluorinated resin film, or a method of forming a resin film on the fluorinated resin film by a printing method using a printing ink containing such a reflective pigment.

As the printing ink to be used in the printing method, a composition comprising a fluorinated copolymer wherein the mass average molecular weight and content of functional groups are defined, has been proposed (e.g. see Patent Document 1).

PRIOR ART DOCUMENT

Patent Document

Patent Document 1: JP-A-2006-152061

DISCLOSURE OF INVENTION

Technical Problem

However, along with the expansion of applications of fluorinated resin films, it is desired to form a resin film having better moist heat resistance and showing better solar reflectance. According to a study made by the present inventors, a resin film formed from the composition described in Patent Document 1 is insufficient in required moist heat resistance and solar reflectance.

The present invention has been made under the above circumstances, and it is an object of the present invention to provide a fluorinated resin composition capable of forming a resin film excellent in moist heat resistance and solar reflectance.

Solution to Problem

The present invention provides a fluorinated resin composition, a coating material and a laminate, having the following constructions [1] to [15].

[1] A fluorinated resin composition which comprises the following composite particles, a fluorinated polymer and a liquid medium:

Composite particles: composite particles having a part or whole of the surface of aluminum particles coated with at least one member selected from the group consisting of an acrylic resin and silica, wherein the total coating amount of the acrylic resin and silica is from 6 to 25 parts by mass per 100 parts by mass of the aluminum particles, and the water surface diffusion area is from 14,000 to 27,000 $cm^2/g$.

[2] The fluorinated resin composition according to [1], wherein the fluorinated polymer is at least one member selected from the group consisting of a tetrafluoroethylene-hexafluoropropylene-vinylidene fluoride copolymer and a fluorinated polymer having hydroxyl groups.

[3] The fluorinated resin composition according to [1] or [2], wherein the content of the composite particles is from 10 to 35 mass % in the solid content.

[4] The fluorinated resin composition according to any one of [1] to [3], wherein the content of the fluorinated polymer is from 90 to 65 mass % in the solid content.

[5] The fluorinated resin composition according to any one of [1] to [4], wherein the mass ratio of the fluorinated polymer to the aluminum particles is from 1 to 4.

[6] A coating agent which comprises the fluorinated resin composition as defined in any one of [1] to [5].

[7] The coating agent according to [6], for forming a resin film from said composite particles and said fluorinated polymer on a substrate comprising a fluorinated polymer.

[8] A laminate which comprises a substrate comprising a fluorinated polymer, and a resin film disposed at least at a partial region on the substrate, wherein the resin film is a resin film formed of the fluorinated resin composition as defined in any one of [1] to [5].

[9] The laminate according to [8], wherein the fluorinated polymer of the substrate is at least one member selected from the group consisting of a vinyl fluoride polymer, a vinylidene fluoride polymer, a vinylidene fluoride-hexafluoropropylene copolymer, a tetrafluoroethylene-hexafluoropropylene-vinylidene fluoride copolymer, a tetrafluoroethylene-propylene copolymer, a tetrafluoroethylene-vinylidene fluoride-propylene copolymer, an ethylene-tetrafluoroethylene copolymer, a hexafluoropropylene-tetrafluoroethylene copolymer, an ethylene-hexafluoropropylene-tetrafluoroethylene copolymer and a perfluoro(alkyl vinyl ether)-tetrafluoroethylene copolymer.

[10] The laminate according to [8] or [9], wherein the thickness of the resin film is from 1 to 5 μm.

[11] The laminate according to any one of [8] to [10], wherein the surface tension of the region on the substrate where the resin film is disposed, is at the 0.035 N/m.

[12] The laminate according to any one of [8] to [11], which is a film material for a film structure building.

[13] The laminate according to any one of [8] to [12], wherein the resin film is formed by a printing method.

[14] A laminate which comprises a substrate comprising a fluorinated polymer, and a resin film disposed at least at a partial region on the substrate, wherein the resin film is formed from the following coated aluminum particles and a fluorinated polymer, the thickness of the resin film is from 1 to 5 μm, and the solar reflectance of the resin film is at least 50%:

Coated aluminum particles: aluminum particles having a part or whole of the surface thereof coated with at least one member selected from the group consisting of an acrylic resin and silica.

[15] The laminate according to [14], wherein in the coated aluminum particles, the total coating weight of the acrylic resin and silica is from 6 to 25 parts by weight per 100 parts by weight of aluminum particles, and the water surface diffusion area is from 14,000 to 27,000 cm$^2$/g.

Advantageous Effects of Invention

According to the present invention, it is possible to provide a fluorinated resin composition capable of forming a resin film excellent in moist heat resistance and solar reflectance.

DESCRIPTION OF EMBODIMENTS

In this specification, a "coating agent" is a flowable composition comprising a resin component and a liquid medium, is one to be used to form the following resin film (the same as the following "dry resin film") and is also referred to as a printing ink. A "wet resin film" means a film containing a resin component and a liquid medium obtained by applying a coating agent on a substrate. A "dry resin film" means a film comprising the resin component obtained by removing the liquid medium from the wet resin film. Here, the "resin film" means a dry resin film unless otherwise specified.

In this specification, hereinafter, a fluorinated polymer in the fluorinated resin composition of the present invention will be referred to as a first fluorinated polymer, and a fluorinated polymer in a substrate constituting the laminate of the present invention will be referred to as a second fluorinated polymer.

In this specification, a (meth) acrylate means at least one of an acrylate and a methacrylate, and (meth) acrylic acid means at least one of acrylic acid and methacrylic acid.

In this specification an "acrylic resin" is meant for a polymer or copolymer obtainable by polymerizing one or more (meth)acrylates, or a copolymer obtainable by copolymerizing one or more (meth)acrylates with one or more copolymerizable monomers other than (meth)acrylates.

[Fluorinated Resin Composition]

The fluorinated resin composition of the present invention is a fluorinated resin composition comprising composite particles, a first fluorinated polymer and a liquid medium.

The fluorinated resin composition contains the composite particles, whereby a resin film formed by using the same shows excellent solar reflectance and further is excellent in moist heat resistance. Especially in a case where a resin film is formed by applying the fluorinated resin composition to a printing method, it shows excellent solar reflectance which cannot be attained by the prior art.

The fluorinated resin composition of the present invention may contain the after-described curing agent, curing catalyst, coloring pigment and other additives, as the case requires.

(Composite Particles)

The composite particles in the present invention are composite particles having a part or whole of the surface of aluminum particles coated with at least one member selected from the group consisting of an acrylic resin and silica, wherein the total coating amount of the acrylic resin and silica is from 6 to 25 parts by mass per 100 parts by mass of the aluminum particles, and are composite particles, of which the water surface diffusion area is from 14,000 to 27,000 cm$^2$/g.

The water surface diffusion area of the composite particles is preferably from 16,000 to 24,000 cm$^2$/g, particularly preferably from 16,000 to 20,000 cm$^2$/g. When the water surface diffusion area of the composite particles is at least the lower limit value in the above range, sufficient solar reflectance is obtainable, and when it is at most the upper limit value in the above range, the moist heat resistance will be excellent.

The water surface diffusion area of the composite particles is measured in accordance with JIS K5906 (1996). Here, the method for measuring the water surface diffusion area of an aluminum pigment for coating material as described in JIS is of the case of a leafing type, whereas composite particles in the present invention is a non-leafing type. Therefore, prior to the measurement of the water surface diffusion area, the following process is conducted, followed then by the measurement. To a powder as aggregates of composite particles, stearic acid is added in an equivalent amount, and a mineral spirit or xylene as industrial gasoline is added in an amount of 10 times, followed by heating to a temperature of at least 60° C. on a sand bath, to cover the surface of the composite particles with stearic acid. After drying to obtain a powder of composite particles, the water surface diffusion area is measured in accordance with JIS K5906 (1996).

The shape of the composite particles is not particularly limited, but the particles preferably have substantially the same shape as aluminum particles before coating. The shape of composite particles is preferably flat or flaky, like aluminum particles.

The average particle diameter of the composite particles is not particularly limited, but, for example, as a mass median particle diameter (D50) being a particle diameter corresponding to a cumulative mass of 50% from the small diameter side, it is preferably from 5 to 20 μm, particularly preferably from 8 to 18 μm.

Preparation of aluminum particles to be used for the composite particles may be preferably carried out by a ball milling method or a vapor deposition method. The shape and size of aluminum particles are not particularly limited, and flat, flaky or the like is preferred.

The average particle size of the aluminum particles is preferably from 5 to 20 μm, particularly preferably from 8 to 18 μm, as the mass median particle diameter (D50).

The water surface diffusion area of the aluminum particles is not particularly limited so long as the water surface diffusion area of composite particles becomes to be in a desired range. The water surface diffusion area of the aluminum particles is preferably from 16,000 to 30,000 cm$^2$/g, particularly preferably from 18,000 to 26,000 cm$^2$/g. When the water surface diffusion area of the aluminum particles is at least the lower limit value in the above range, the obtainable resin film will be excellent in solar reflectance, and when it is at most the upper limit value in the above range, the resin film will be excellent in moist heat resistance.

The water surface diffusion area of the aluminum particles can be measured in the same manner as the water surface diffusion area of the composite particles.

Since the composite particles are a composite having a part or whole of the surface of aluminum particles coated with at least one member selected from the group consisting of an acrylic resin and silica, the obtainable resin film will be excellent in weather resistance and moist heat resistance.

From such a viewpoint that the weather resistance and moist heat resistance are particularly excellent, it is preferred that whole of the surface of the aluminum particles is coated with at least one member selected from the group consisting of an acrylic resin and silica. The coating is preferably only an acrylic resin, only silica, or both an acrylic resin and silica, and from such a viewpoint that the production is easy, only an acrylic resin or only silica is particularly preferred.

The total coating amount of the acrylic resin and silica is from 6 to 25 parts by mass, particularly preferably 6 to 12 parts by mass, per 100 parts by mass of aluminum particles. When the coating amount is at least the lower limit value in the above range, the resin film will be excellent in weather resistance and moist heat resistance, and when it is at most the upper limit value in the above range, the resin film will be excellent in initial solar reflectance.

Here, the coating amount of the acrylic resin in the composite particles is obtained by mixing the composite particles with a mixed acid to dissolve aluminum, whereupon the acrylic resin insoluble in the mixed acid, is collected by filtration, and its mass is measured.

The coating amount of the silica in the composite particles is obtained by measuring the content ratio of aluminum atoms and silicon atoms by analyzing the solution having the composite particles dissolved in the mixed acid by an inductively coupled plasma emission spectrometer (ICP).

The total coating amount of the acrylic resin and silica is large as compared to the coating amount in a conventional coated aluminum composite particles. By doing so, even in the case of forming a resin film particularly on a substrate comprising a second fluorinated polymer as described later, deterioration of the composite particles in the resin film is suppressed, whereby it is considered possible to accomplish excellent solar reflectance and wet heat resistance, which used to be impossible to accomplish by the prior art.

Details may be described as follows. In the case of forming a resin film on a substrate comprising a second fluorinated polymer, in order to improve the adhesion between the fluorinated resin composition and the substrate, it is common to apply treatment to increase the surface tension of the substrate, such as corona discharge treatment. When corona discharge treatment is applied to a substrate comprising a second fluorinated polymer, for example, oxygen functional groups will be formed at the substrate surface, whereby the adhesion is considered to be further improved. Oxygen functional groups at the substrate surface are considered to be formed, as C—C bonds, C—F bonds, etc. in the main chain or side chain of the fluorinated polymer are cut to form oxygen functional groups such as CH=O, COOH, etc. Thus, along with formation of oxygen functional groups, free F ions, hydrofluoric acid and fluorooligomers to generate F ions by light or heat, are considered to be formed. Further, the second fluorinated polymer may contain HF substantially by e.g. the thermal history during its polymerization or at the time of the film formation. If such F ions, etc. are in contact with water, they are likely to form an acid thereby to dissolve the aluminum, whereby as the time passes, solar reflectance of the resin film is considered to be decreased. On the other hand, in the composite particles to be used in the present invention, aluminum particles are coated with a sufficient amount of at least one member selected from the group consisting of an acrylic resin and silica, whereby deterioration of the composite particles in the resin film is suppressed, and it is considered possible to accomplish both excellent solar reflectance and moist heat resistance which used to be impossible to attain by the prior art.

The composite having the surface of aluminum particles coated with an acrylic resin may be produced, for example, by polymerizing a (meth)acrylic monomer on the surface of aluminum particles (e.g. JP-A-2001-329226, JP-A-58-141248, etc.).

The composite having the surface of aluminum particles coated with silica may be produced, for example, by hydrolyzing a silicon alkoxide or the like on the surface of aluminum particles (e.g. JP-A-2002-88274, etc.).

The content of the composite particles in the fluorinated resin composition of the present invention is preferably from 10 to 35 mass %, particularly preferably from 20 to 35 mass %, in the solid content of the fluorinated resin composition. When the content of the composite particles is at least the lower limit value in the above range, the resin film will be excellent in hiding properties and solar reflectance. When it is at most the upper limit value in the above range, the viscosity of the fluorinated resin composition tends to be low whereby printing will be easy, and further adhesion to the substrate will be excellent.

Here, the solid content of the fluorinated resin composition means a residue obtained by removing the liquid medium from the fluorinated resin composition. Therefore, the content of the composite particles in the resin film formed from a fluorinated resin composition is the same as the content of the composite particles in the solid content of the fluorinated resin composition.

As the composite particles, one type may be used alone, or two or more types may be used in combination.

From the viewpoint of excellent solar reflectance of the resin film, the fluorinated resin composition preferably contains the composite particles having a water surface diffusion area of from 14,000 to 27,000 $cm^2/g$ in an amount of from 10 to 35 mass % in the solid content. The water surface diffusion area of the composite particles is preferably from 16,000 to 24,000 $cm^2/g$, particularly preferably from 16,000 to 20,000 $cm^2/g$. When the water surface diffusion area of the composite particles is at least the lower limit value in the above range, the resin film will be excellent in solar reflectance, and when it is at most the upper limit value in the above range, deterioration in the accelerated weathering test and the 80° C. hot bath steam condensation test is less likely to occur.

(First Fluorinated Polymer)

The fluorinated resin composition of the present invention comprises at least one type of the first fluorinated polymer. The first fluorinated polymer preferably contains units derived from at least a fluoroolefin. The first fluorinated polymer may, for example, be a homopolymer having only units derived from a fluoroolefin, or a copolymer having at least one type of units derived from a fluoroolefin and at least one type of units derived from a monomer copolymerizable with the fluoroolefin, and from the viewpoint of excellent adhesion to the substrate, the copolymer is preferred.

The fluoroolefin may, for example, be vinylidene fluoride, trifluoroethylene, chlorotrifluoroethylene, tetrafluoroethylene, pentafluoropropylene, hexafluoropropylene, etc.

As the fluoroolefin, one type may be used alone, or two or more types may be used in combination.

The monomer copolymerizable with the fluoroolefin in the copolymer may be a monomer having a hydroxy group (hereinafter referred to also as a "monomer (a1)") or another monomer different from the fluoroolefin and monomer (a1)) (hereinafter referred to also as a "monomer (a2)").

The monomer (a1)) is preferably a monomer having an ethylenically unsaturated bond and a hydroxy group. The monomer (a1) may, for example, be allyl alcohol, a hydroxyalkyl vinyl ether (such as 2-hydroxyethyl vinyl ether, 4-hydroxybutyl vinyl ether, cyclohexanediol monovinyl ether, etc.), a hydroxyalkyl allyl ether (such as 2-hydroxyethyl allyl ether, etc.), a vinyl hydroxyalkanoate (such as vinyl hydroxypropionate, etc.), a (meth)acrylic acid hydroxyalkyl ester (such as hydroxyethyl (meth)acrylate), etc.

As the monomer (a1), one type may be used alone, or two or more types may be used in combination.

The monomer (a2) is preferably a vinyl monomer, i.e. a compound having an ethylenic unsaturated bond and containing no hydroxy group or fluorine atom. The vinyl monomer is excellent in alternating copolymerizability with a fluoroolefin and can increase the polymerization yield. Further, even when it remains unreacted, its influence to the fluorinated resin is less, and it can be easily removed in the production process.

The vinyl monomer may, for example, be a vinyl ether, an allyl ether, a carboxylic acid vinyl ester, a carboxylic acid allyl ester, an olefin, etc.

The vinyl ether may, for example, be a cycloalkyl vinyl ether such as cyclohexyl vinyl ether, or an alkyl vinyl ether such as nonyl vinyl ether, 2-ethylhexyl vinyl ether, hexyl vinyl ether, ethyl vinyl ether, n-butyl vinyl ether or t-butyl vinyl ether.

The allyl ether may, for example, be an alkyl allyl ether such as ethyl allyl ether or hexyl allyl ether.

The carboxylic acid vinyl ester may, for example, be a vinyl ester of a carboxylic acid such as acetic acid, butyric acid, pivalic acid, benzoic acid or propionic acid. Further, as the vinyl carboxylate having a branched alkyl group, commercially available VeoVa-9 or VeoVa 10 (trade name, manufactured by Shell Chemical Co., Ltd.) may be used.

The carboxylic acid allyl ester may, for example, be an allyl ester of a carboxylic acid such as acetic acid, butyric acid, pivalic acid, benzoic acid or propionic acid.

The olefin may, for example, be ethylene, propylene, isobutylene, etc.

As the monomer (a2), one type may be used alone, or two or more types may be used in combination.

Specifically, the first fluorinated resin may, for example, be a vinyl fluoride polymer (hereinafter referred to also as "PVF"), a vinylidene fluoride polymer (hereinafter referred to also as "PVDF"), a tetrafluoroethylene-hexafluoropropylene propylene-vinylidene fluoride copolymer (hereinafter referred to also as "THV"), an ethylene-tetrafluoroethylene copolymer (hereinafter referred to also as "ETFE"), a hexafluoropropylene-tetrafluoroethylene copolymer (hereinafter referred to also as "FEP"), an ethylene-hexafluoropropylene-tetrafluoroethylene copolymer (hereinafter referred to also as "EFEP"), a perfluoro(alkyl vinyl ether)-tetrafluoroethylene copolymer (hereinafter referred to also as "PEA"), a chlorotrifluoroethylene polymer (hereinafter referred to also as "PCTFE"), an ethylene-chlorotrifluoroethylene copolymer (hereinafter referred to also as "ECTFE"), a tetrafluoroethylene-2,2-bistrifluoromethyl-4,5-difluoro-1,3-dioxole copolymer, or a copolymer of a monomer constituting such a polymer or copolymer and the monomer (a1) (i.e. a copolymer having hydroxy groups). Among these, from the viewpoint of excellent moist heat resistance and adhesion to the substrate, at least one member selected from the group consisting of THV and a copolymer having hydroxy groups, is particularly preferred.

As the first fluorinated polymer, from the viewpoint of excellent adhesion to the substrate and solvent solubility, a copolymer having polar groups (such as hydroxy groups) is preferred, and from the viewpoint of excellent curability, a copolymer having hydroxy groups (hereinafter referred to also as "copolymer (A1)") is particularly preferred.

The copolymer (A1) is preferably a polymer having units derived from at least one type of fluoroolefin, units derived from at least one type of monomer (a1), and units derived from at least one type of monomer (a2). By having units derived from the monomer (a1), adhesion to the substrate will be excellent, and when used in combination with a curing agent, it is possible to form a resin film having excellent mechanical strength after curing. By having units derived from the monomer (a2), it is possible to further impart other properties (such as solvent solubility, optical transparency, gloss, hardness, flexibility, pigment dispersibility, etc.).

The fluoroolefin in the copolymer (A1) may be the same one as the fluoroolefin in the aforementioned copolymer, and preferred examples are also the same.

The monomer (a1)) in the copolymer (A1) may be the same one as the monomer (a1) in the aforementioned copolymer, and preferred examples are also the same.

The monomer (a2) in the copolymer (A1) may be the same one as the monomer (a2) in the aforementioned copolymer, and from the viewpoint of excellent flexibility and better followability to deformation of the substrate, one having a linear or branched alkyl group having 3 or more carbon atoms, is preferred.

As a combination of monomers constituting the copolymer (A1), from the viewpoint of excellent weather resistance, adhesion to the substrate and flexibility, the following combination (1) is preferred, and the following combination (2) or (3) is particularly preferred.

Combination (1)

Fluoroolefin: tetrafluoroethylene or chlorotrifluoroethylene,

Monomer (a1): a hydroxyalkyl vinyl ether,

Monomer (a2): at least one member selected from the group consisting of a cycloalkyl vinyl ether, an alkyl vinyl ether and a carboxylic acid vinyl ester.

Combination (2)

Fluoroolefin: tetrafluoroethylene,

Monomer (a1): a hydroxyalkyl vinyl ether,

Monomer (a2): t-butyl vinyl ether and a carboxylic acid vinyl ester.

Combination (3)

Fluoroolefin: chlorotrifluoroethylene,

Monomer (a1): a hydroxyalkyl vinyl ether,

Monomer (a2): t-butyl vinyl ether and a carboxylic acid vinyl ester.

The proportion of units derived from the fluoroolefin is preferably from 30 to 70 mol %, particularly preferably from 40 to 60 mol %, in all units (100 mol %) in the copolymer (A1). When the proportion of units derived from the fluoroolefin is at least the lower limit value in the above range, weather resistance will be excellent, and when it is at most the upper limit value in the above range, adhesion to the substrate will be excellent.

The proportion of units derived from the monomer (a1)) is preferably from 0.5 to 20 mol %, particularly preferably from 1 to 15 mol %, in all units (100 mol %) in the copolymer (A1). When the proportion of units derived from the monomer (a1) is at least the lower limit value in the above range, adhesion to the substrate will be excellent, and when it is at most the upper limit value in the above range, the resin film will be excellent in flexibility.

The hydroxy value of the copolymer (A1) is not particularly limited and may be made to be, for example, from 10 to 150 mg/KOH. The hydroxy value of the copolymer (A1) can be measured in accordance with JIS K0070 (1992).

The proportion of units derived from the monomer (a2) is preferably from 20 to 60 mol %, particularly preferably from 30 to 50 mol %, in all units (100 mol %) in the copolymer (A1). When the proportion of units derived from the monomer (a2) is at least the lower limit value in the above range, the resin film will be excellent in flexibility. When it is at most the upper limit value in the above range, adhesion to the substrate will be excellent.

The number average molecular weight of the copolymer (A1) is preferably from 3,000 to 50,000, particularly preferably from 5,000 to 30,000. When the number average molecular weight of the copolymer (A1) is at least the lower limit value in the above range, heat resistance will be excellent, and when it is at most the upper limit value in the above range, solubility in a solvent will be good.

Commercial products of THV may, for example, be THV (trade name) series (such as THV200, THV220, THV415, THV500, etc.) (manufactured by 3M Co.), etc.

Commercial products of the copolymer (A1) may, for example, be Lumiflon (registered trademark) series (such as LF200, LF100, LF710, etc.) (manufactured by Asahi Glass Co., Ltd.), ZEFFLE (registered trademark) GK Series (such as GK-500, GK-510, GK-550, GK-570, GK-580, etc.) (manufactured by Daikin Industries, Ltd.), Furuoneto (registered trademark) series (such as K-700, K-702, K-703, K-704, K-705, K-707, etc.) (manufactured by DIC Corporation), ETERFLON series (such as 4101, 41011, 4102, 41021, 4261A, 4262A, 42631, 4102A, 41041, 41111, 4261A, etc.) (manufactured by Eternal Chemical Co., Ltd.), etc.

The content of the first fluorinated polymer in the fluorinated resin composition is preferably from 90 to 65 mass %, particularly preferably from 80 to 65 mass %, in the solid content (100 mass %) of the fluorinated resin composition.

In the fluorinated resin composition, the mass ratio of the first fluorinated polymer to the aluminum particles is preferably from 1 to 4, more preferably from 1.5 to 4, particularly preferably from 2.5 to 4. When the mass ratio is at least the lower limit value in the above range, adhesion to the substrate will be excellent, and when it is at most the upper limit value in the above range, the resin film will be excellent in solar reflectance.

(Liquid Medium)

The fluorinated resin composition contains a liquid medium. The liquid medium may, for example, be an organic solvent including an aromatic hydrocarbon solvent such as toluene, xylene or Solvesso (an aromatic hydrocarbon mixture, manufactured by Exxon), a ketone such as methyl ethyl ketone or cyclohexanone, an alcohol such as ethanol, isopropyl alcohol or propylene glycol, an ether such as propylene glycol monomethyl ether or dipropylene glycol monomethyl ether, an amide solvent such as N-methylpyrrolidone, etc. and water.

As the liquid medium, one type may be used alone, or two or more types may be used in combination.

For example, in a case where a resin film is formed on a substrate by applying the fluorinated resin composition by a printing method (e.g. gravure printing, screen printing, etc.), as the liquid medium, an optimum liquid medium may be selected depending on the printing method and the type of the substrate, etc. in consideration of e.g. repellency of the printing ink (the fluorinated resin composition) on the substrate, the transfer rate, drying properties of the printing ink and storage stability of the printing ink, etc. For example, in the gravure printing on a fluorinated resin film, in order to reduce printing defects such as uneven coating, blurring, etc., preferred is a liquid medium whereby the Zahn cup No. 3 viscosity would be from 15 to 30 seconds. Further, toluene, xylene, methyl ethyl ketone and a mixed solvent thereof are preferred from such a viewpoint that the surface of a surface-treated fluorinated resin film can be easily be wetted, and the boiling point is not so high.

(Curing Agent)

The fluorinated resin composition of the present invention may contain a curing agent. When the fluorinated resin composition contains a curing agent, it is possible to form a resin film having better water resistance. The curing agent may be suitably selected from commonly employed curing agents depending on e.g. the type of curable groups which the fluorinated polymer has (e.g. hydroxy groups which the copolymer (A1) has). The curing agent may, for example, be an isocyanate curing agent, a blocked isocyanate curing agent, an aminoplast curing agent, a polyvalent carboxylic acid curing agent, a polyvalent amine curing agent, etc. The curing agent to be used in combination with the copolymer (A1) is preferably at least one member selected from the group consisting of an isocyanate curing agent, a blocked isocyanate curing agent and an aminoplast curing agent.

The curing agent may be used by mixing it at the time of use of the fluorinated resin composition. That is, it may be used for a two-component curable ink composition using two liquids i.e. a main agent composed of a fluorinated resin composition containing no curing agent and an aid agent containing the curing agent. A curing agent suitable for such a two-component curable type is a curing agent to undergo a curing reaction at room temperature (25° C.), and a non-yellowing diisocyanate curing agent such as hexamethylene diisocyanate or isophorone diisocyanate, or a polyvalent isocyanate curing agent, such as an adduct or oligomer of such a non-yellowing diisocyanate, may, for example, be mentioned.

When the fluorinated resin composition contains a curing agent, the content thereof is preferably from 1 to 20 parts by mass, particularly preferably from 2 to 10 parts by mass, per 100 parts by mass of the first fluorinated polymer.

The fluorinated resin composition may further contain a curing catalyst such as dibutyltin dilaurate in addition to the curing agent.

As the curing agent and curing catalyst, one type may be used alone, or two or more types may be used in combination.

(Coloring Pigment)

The fluorinated resin composition of the present invention may contain a coloring pigment. The coloring pigment may, for example, be an organic pigment, an inorganic pigment, etc. Specifically the coloring pigment may, for example, be carbon black (black pigment), iron oxide (red pigment), aluminum cobalt oxide (blue pigment), copper phthalocyanine (blue pigment, green pigment), perylene (red pigment), bismuth vanadate (yellow pigment), etc.

When the fluorinated resin composition contains a coloring pigment, the content thereof is such that the total amount with the composite particles is preferably from 30 to 100 parts by mass, particularly preferably from 60 to 80 parts by mass, per 100 parts by mass of the first fluorinated polymer.

(Other Additives)

The fluorinated resin composition of the present invention may further contain additives other than the curing agent and pigment as the case requires. Other additives may, for example, be an antifoaming agent to adjust the printability, a matting material such as silica, alumina, etc., a tack modifier made of a polyolefin to improve tackiness (stickiness) of a printing ink, etc. When the fluorinated resin composition contains other additives, the content thereof is preferably from 0.1 to 2 mass % in the solid content of the fluorinated resin composition.

(Applications)

The fluorinated resin composition of the present invention is suitable as a coating agent. The present invention is also a coating agent comprising the fluorinated resin composition of the present invention. The coating agent of the present invention is also meant for a printing ink which is applied by a printing method.

By applying the coating agent of the present invention on a substrate surface to form a wet resin film, and by removing the liquid medium from the wet resin film to form a dry resin film, it is possible to form a resin film comprising the composite particles and the first fluorinated polymer on the substrate surface. The portion to be coated with the coating agent of the present invention may be the surface of a substrate, or may be a portion of the surface. Further, by using the coating agent of the present invention as a printing ink, it is possible to form a printed portion made of a resin film by printing it on the substrate surface by a printing method.

The coating agent of the present invention is suitable for use to form a resin film particularly on a surface containing a second fluorinated polymer of a substrate. By forming the resin film on the substrate, it is possible to impart excellent solar reflectance to the substrate, and the formed resin film is excellent in moist heat resistance.

[Laminate]

A first embodiment of the laminate of the present invention comprises a substrate containing a second fluorinated polymer and a resin film formed of the above-described fluorinated resin composition disposed at least at a partial region on the substrate. Further, a second embodiment of the laminate of the present invention comprises a substrate containing a second fluorinated polymer and a resin film disposed at least at a partial region on the substrate, wherein the resin film is formed from the following coated aluminum particles and the first fluorinated polymer, the thickness of the resin film is from 1 to 5 µm, the solar reflectance of the resin film is at least 50%, and the coated aluminum particles are aluminum particles having a part or whole of the surface coated with at least one member selected from the group consisting of an acrylic resin and silica.

The laminate of the present invention has excellent solar reflectance and moist heat resistance, and is further excellent in weather resistance and adhesion between the resin film and the substrate. The laminate of the present invention is suitably used as a film material for a film structure building. Here, the solar reflectance is measured by means of a spectrophotometer in accordance with JIS R3106 (1998) "Test method for transmittance, reflectance, emissivity, solar radiation heat acquiring efficiency of sheet glass".

The coated aluminum particles in the second aspect are preferably the same coated aluminum particles as the composite particles in the first embodiment. That is, aluminum particles before coating in the coated aluminum particles are preferably the same aluminum particles as aluminum particles before coating in the composite particles. Further, the total coating amount of the acrylic resin and silica in the coated aluminum particles is preferably from 6 to 25 parts by mass per 100 parts by mass of aluminum particles, and the water surface diffusion area is preferably from 14,000 to 27,000 $cm^2/g$. That is, the coated aluminum particles in the second embodiment are preferably the above described composite particles.

(Substrate)

The substrate in the first and second embodiments may be any one so long as it contains at least one type of the second fluorinated polymer. The content of the second fluorinated polymer in the substrate is preferably at least 60 mass %, more preferably at least 70 mass %, particularly preferably 100 mass %.

The shape, size, etc. of the substrate are not particularly limited. A preferred shape of the substrate is a film or sheet.

In the second fluorinated polymer, the fluorine atom content is preferably at least 45 mass %, more preferably at least 50 mass %, particularly preferably at least 55 mass %. When the fluorine atom content is at least the lower limit value in the above range, the substrate will be excellent in stain resistance, chemical resistance, non-tackiness and weather resistance, particularly excellent in non-stickiness and stain resistance.

Further, the substrate preferably has a light transmitting property. The total light transmittance of the substrate is preferably at least 70%, particularly preferably at least 85%. Here, the total light transmittance is measured in accordance with JIS K7375 (2008).

The second fluorinated polymer is preferably at least one member selected from the group consisting of PVF, PVDF, a vinylidene fluoride-hexafluoropropylene copolymer, THV, a tetrafluoroethylene-propylene copolymer, a tetrafluoroethylene-vinylidene fluoride-propylene copolymer, ETFE, FEP, EFEP and PFA.

At least one member selected from the group consisting of PVDF, a vinylidene fluoride-hexafluoropropylene copolymer, ETFE, FEP and PFA, is more preferred, and at least one member selected from the group consisting of ETFE, FEP and PFA, is particularly preferred.

As the second fluorinated polymer, from the viewpoint of excellent transparency, a polymer having a fluorinated aliphatic ring structure may also be used. As such a polymer, (i) a polymer obtained by polymerizing a monomer having a fluorinated cyclic structure, or (ii) a polymer having a fluorinated aliphatic ring structure in the main chain obtained by cyclo-polymerizing a fluorinated monomer having at least two polymerizable double bonds, may be mentioned.

The polymer (i) may, for example, be a homopolymer of a monomer having a fluorinated cyclic structure, such as perfluoro(2,2-dimethyl-1,3-dioxole), or a copolymer of a monomer having such a fluorinated ring structure and a monomer such as tetrafluoroethylene (see JP-A-63-18964, etc.). The polymer (ii) may, for example, be a cyclopolymerized polymer of a fluorinated monomer having at least two polymerizable double bonds such as perfluoro(allyl vinyl ether) or perfluoro(butenyl vinyl ether), or a copolymer of such a fluorinated monomer and a monomer such as tetrafluoroethylene (see JP-A-63-238111, JP-A-63-238115, etc.).

When the shape of the substrate is a film or sheet, its thickness is preferably from 5 to 500 µm, more preferably from 10 to 300 µm, particularly preferably from 100 to 300 µm. When the thickness of the substrate is at least the lower limit value in the above range, the substrate will be excellent in mechanical strength, and when it is at most the upper limit value in the above range, the substrate will be excellent in transparency.

The substrate is preferably one subjected to surface treatment to increase the surface tension in order to improve the adhesion with the resin film.

As the surface treatment method, corona discharge treatment, metal sodium treatment, mechanical roughening treatment, excimer laser treatment, etc. may be mentioned, and among them, corona discharge treatment is preferred.

Corona discharge treatment is preferably carried out sequentially by placing a corona discharge treatment machine on the production line of the substrate. The treating conditions are selected depending upon the type of the substrate and the desired degree of treatment, and it is preferred to carry out treatment at an intensity of from about 0.1 to 10 kW at a rate of from about 0.5 to 100 m²/min.

The surface tension of the substrate is preferably at least 0.035 N/m, particularly preferably at least 0.04 N/m. When the surface tension of the substrate is at least the lower limit value in the above range, adhesion between the substrate and the resin film will be improved. This is considered to be such that, for example, by the surface treatment, oxygen functional groups, etc. are formed on the surface of the substrate, and such functional groups on the substrate side and hydroxyl groups present in the first fluorinated copolymer contained in the resin film will form chemical bonds, whereby the adhesion between the substrate and the resin film will be improved.

(Resin film)

In the first and second embodiments, the thickness of the resin film is preferably from 1 to 5 µm, more preferably from 1 to 4 µm, particularly preferably from 2 to 4 µm. When the thickness of the resin film is at least the lower limit value in the above range, solar reflectance will be excellent, and when it is at most the upper limit value in the above range, the resin film will be excellent in followability to bending or elongation of the substrate.

When the substrate is a film or sheet, usually the resin film is formed on one side. The resin film may be formed on the entire surface of one side. Preferably, the resin film is formed on a portion of one side by a printing method, etc.

When the resin film is formed on a portion of the substrate surface, the shape of the resin film is not particularly limited, and, for example, character, circle, ellipse, polygon, etc. may be mentioned.

The area ratio of the resin film to the total area of the substrate surface (the area of one side when the substrate is a film- or sheet-form) may be suitably selected depending on the purpose, etc., and, for example, it may be from 10 to 95%.

Further, the resin film may be formed on the surface of at least one side of the substrate, or it may be formed on both surfaces.

The solar reflectance of the resin film is preferably at least 50%, particularly preferably at least 60%, when the thickness of the resin film is from 1 to 5 µm. The upper limit of the solar reflectance is not particularly limited but is preferably at most 90%, particularly preferably at most 80%.

(Method for Producing Laminate)

The method for producing a laminate may be a method comprising a step of applying the above-described fluorinated resin composition to at least a partial region on the substrate to form a wet resin film and a step of removing at least a part of the liquid medium from the wet resin film to form a resin film.

The method for applying the fluorinated resin composition may, for example, be a printing method such as gravure printing, silk, etc., a coating method such as spray coating, die coater, etc. Among them, a printing method is preferred, and gravure printing is particularly preferred.

The method for removing the liquid medium from the wet resin film may, for example, be heat treatment, drying under reduced pressure processing, drying under reduced pressure processing, etc. In a case where removal of the liquid medium is conducted by heat treatment, the heating temperature is preferably from 30 to 150° C., particularly preferably from 60 to 120° C.

The removal amount of the liquid medium from the wet resin film is not particularly limited. The removal amount of the liquid medium may be made, for example, to be at least 90 mass %, particularly preferably at least 99 mass %, of the liquid medium contained in the fluorinated resin composition.

The removal of the liquid medium from the wet resin film may be carried out by a single treatment or may be carried out by plural times of treatment.

The method for producing a laminate may further contain other steps as the case requires. For example, if the fluorinated resin composition contains a curing agent, the method may further contain a step of forming a cured product by reacting the curing agent with the first fluorinated polymer. The reaction conditions of the curing agent and the first fluorinated polymer may be suitably selected depending on the type of the curing agent, etc. As the reaction conditions, for example, heat treatment at from 60 to 150° C. for from 2 to 30 seconds, may be mentioned.

Further, if the fluorinated resin composition does not contain a curing agent, the method may further contain a step of heat melting after removal of the liquid medium from the wet resin film, followed by cooling to form a resin film. The conditions for the heat melting may be suitably selected depending on the glass transition temperature of the first fluorinated polymer, etc. For example, heat treatment at a temperature of from 60 to 150° C. for from 2 to 30 seconds, may be mentioned. It is thereby possible to improve adhesion between the substrate and the resin film.

(Film Material for Film Structure Building)

The laminate in the present invention can be applied to a film material for a film structure building. A film structure building is composed of a single layer or two or more layers of film material for a film structure building. When the solar transmittance of the laminated entire film material for a film structure building becomes at most 70%, feeling of coolness will begin to be felt, and when it becomes at most 10%, feeling of darkness and coldness will be felt.

Adjustment of the solar transmittance can be done by adjusting the solar reflectance of the film material for a film structure building by suitably adjusting the area of the resin film, etc. Because of high solar reflectance of the resin film in the present invention, the degree of freedom for a pattern to be formed by e.g. a printing method is large, whereby the degree of freedom for solar transmittance and solar reflectance is increased. It is thereby possible to obtain a film material for a film structure building excellent in designability, and it becomes readily possible to satisfy both environmental control and designability in the film structure building. Further, solar transmittance is reduced by reflection and absorption of the resin film, but in the present invention, the contribution of reflection is high, so that it is possible to prevent a rise of the temperature of the film itself, or re-radiation from the film into the structure building. The adjustment of solar transmittance can also be made by the color density of a color film having a pigment of white color or blue color, etc. incorporated in the film itself.

The solar reflectance (%) of the entire laminate is calculated by the following formula, from the solar reflectances (%) of the resin film and the substrate, and the area ratio (%) of the resin film.

Solar reflectance of the laminate=(solar reflectance of the resin film)×(area ratio of the resin film)/

100+(solar reflectance of the substrate)×(100− area ratio of the resin film)/100 (Formula)

For example, in a case where on a substrate of a fluorinated resin film with a solar reflectance of 4%, a resin film is formed on 70% of the surface area of the fluorinated resin film, and the solar reflectance of the resin film is 60%, the solar reflectance of the entire laminate is calculated to be 43.2%.

Figure 1:
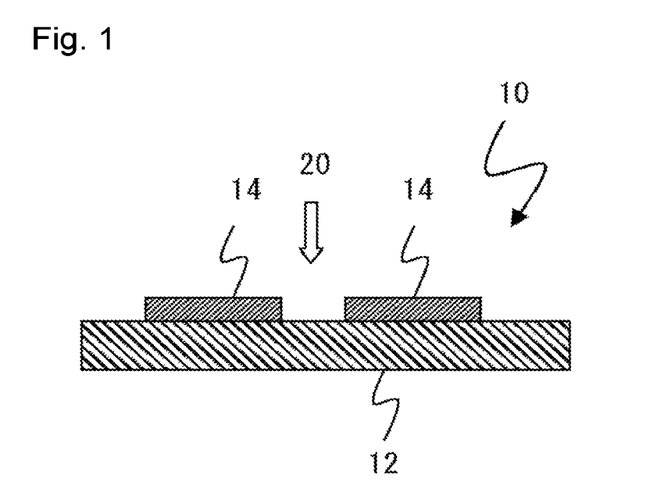
FIG. 1 is a schematic sectional view showing an example of the laminate of the present invention.
Figure 2:
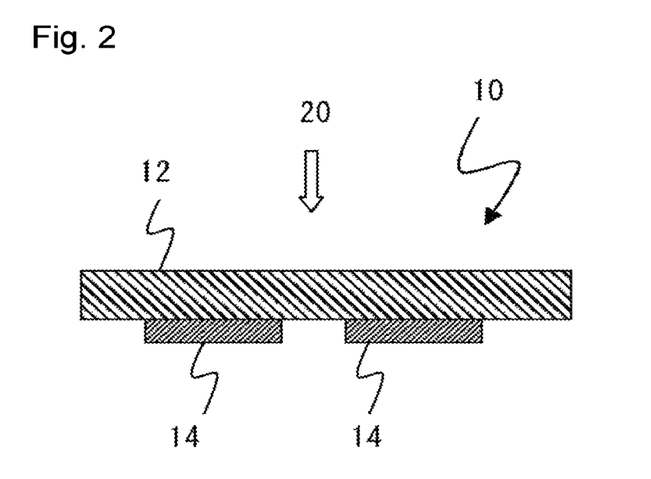
FIG. 2 is a schematic sectional view showing another example of the laminate of the present invention.

An example of a construction of the laminate will be described with reference to the drawings. FIGS. 1 and 2 are schematic cross-sectional views each showing an example of a construction of a laminate as a film material 10 for a film structure building. FIG. 1 is a schematic cross-sectional view of a top printing type film material 10 for a film structure building, having a resin film 14 formed on a surface on the side where the incident light 20 enters, among the two surfaces of a substrate 12 being a fluorinated resin film. FIG. 2 is a schematic cross-sectional view of a back printing type film material 10 for a film structure building, having a resin film 14 formed on a surface opposite to the side where the incident light 20 enters, among the two surfaces of a substrate 12 being a fluorinated resin film Composite particle paste (5): trade name: EMR-D5660, manufactured by Toyo Aluminium K.K.

Composite particle paste (6): trade name: 91-2343T, manufactured by Toyo Aluminium K.K.

Composite particle paste (7): trade name: WZA7670, manufactured by Toyo Aluminium K.K.

Composite particle paste (8): trade name: BPA6390, manufactured by Toyo Aluminium K.K.

Composite particle paste (9) trade name: EMR-B5680, manufactured by Toyo Aluminium K.K.

Composite particle paste (10): trade name: BP5640PA, manufactured by Toyo Aluminium K.K.

Composite particle paste (11): trade name: BP4690PA, manufactured by Toyo Aluminium K.K.

Composite particle paste (12): trade name: HR7000, manufactured by Asahi Kasei Chemicals Corporation Further, 7675NS, 6390NS, 5680NS, 5640NS and 4690NS in Table 1 are, respectively, trade names of composite particle pastes manufactured by Toyo Aluminium K.K.

TABLE 1

| Composite particle paste | | (1) | (2) | (3) | (4) | (5) | (6) |
|---|---|---|---|---|---|---|---|
| Solid content of composite particle paste (mass %) | | 61 | 55.4 | 49.8 | 50 | 49.5 | 61 |
| Aluminum particles | Type | 5660NS | 5660NS | 5660NS | 5660NS | 5660NS | 7675NS |
| | Water surface diffusion area (cm²/g) | 24,000 | 24,000 | 24,000 | 24,000 | 24,000 | 19,500 |
| Surface treatment | Type | Nil | Cross linked acryl | Cross linked acryl | Cross linked acryl | Silica | Cross linked acryl |
| | Coating amount (parts by mass) | — | 4 | 12 | 25 | 15 | 3.3 |
| Composite particles Water surface diffusion area (cm²/g) | | — | 21,000 | 18,000 | 14,500 | 17,000 | 16,500 |

| Composite particle paste | | (7) | (8) | (9) | (10) | (11) | (12) |
|---|---|---|---|---|---|---|---|
| Solid content of composite particle paste (mass %) | | 47 | 55 | 45 | 56 | 50 | 50 |
| Aluminum particles | Type | 7675NS | 6390NS | 5680NS | 5640NS | 4690NS | Not known |
| | Water surface diffusion area (cm²/g) | 19,500 | 27,000 | 26,000 | 16,000 | 40,000 | Not known |
| Surface treatment | Type | Silica | Cross linked acryl | Silica | Cross linked acryl | Cross linked acryl | Cross linked acryl |
| | Coating amount (parts by mass) | 10 | 6 | 6 | 12 | 12 | 4 |
| Composite particles Water surface diffusion area (cm²/g) | | 14,000 | 22,000 | 21,000 | 12,000 | 29,000 | 13,000 |

EXAMPLES

Now, the present invention will be described in detail with reference to Examples. However, the present invention is not limited by the following description. Here, Ex. 4 to 9 and 13 to 16 are Examples of the present invention, and Ex. 1 to 3, 10 to 12 and 17 to 21 are Comparative Examples.

Composite particle pastes used are as follows, respectively, each being a paste of pasty surface-treated aluminum particles containing a solvent. The type and surface diffusion area of aluminum particles constituting the composite particles, the surface treatment and its coating amount, as well as the water surface diffusion area of the composite particles, are shown in Table 1. Here, the coating amount of the surface treatment is a coating amount (parts by mass) per 100 parts by mass of aluminum particles.

Composite particle paste (1): trade name: 5660NS, manufactured by Toyo Aluminium K.K.

Composite particle paste (2): trade name: BPA280PA, manufactured by Toyo Aluminium K.K.

Composite particle paste (3): trade name: BP280PA, manufactured by Toyo Aluminium Co. manufacturing Composite particle paste (4): trade name: BPZ6370, manufactured by Toyo Aluminium K.K.

Methods for evaluation of laminates obtained in Examples and Comparative Examples are as follows.
(Adhesion to Substrate)

Before and after the accelerated weathering test, a cellophane tape was bonded to the resin film side of a laminate, and the cellophane tape was peeled five times, whereupon the state of the resin film was visually observed and evaluated by the following standards.

○ (good): At least 90% of the resin film still remained.

Δ (acceptable): At least 60% and less than 90% of the resin film still remained.

x (no good): Less than 60% of the resin film remained.
(Solar Reflectance)

The solar reflectance of a laminate was measured by means of a spectrophotometer (UV-3100PC, manufactured by Shimadzu Corp.) in accordance with JIS R3106 (1998) "Test methods for transmittance, reflectance, emissivity, solar heat acquiring rate of sheet glass".

The solar reflectance was measured by radiating light from the substrate side in each of top print exposure and back print exposure.

With respect to the solar reflectance, the initial value being at least 50% was taken as acceptable, and with respect to the solar reflectance retention rates after various tests, one being at least 80% was taken as acceptable.

(85° C.×85% RH Constant Temperature and Humidity Test)

A laminate was tested by putting it in a constant temperature and humidity chamber at 85° C. under a relative humidity of 85% for 1,000 hours. The solar reflectance of the resin film before and after the test was measured, and the solar reflectance retention was calculated by the following formula.

Solar reflectance retention=solar reflectance of the resin film after the test/solar reflectance of the resin film before the test (80° C. Hot Bath Steam Condensation Test)

In a room maintained to be at 23° C., a bath filled with water (hot bath with temperature regulator) was prepared, and above the bath, the resin film side of a laminate was disposed at an inclination angle of 21 degrees to form a closed space consisting of the hot bath and the laminate, and the water temperature was maintained to be at 80° C. Steam, when in contact with the resin film of the laminate, is chilled and condensed, and flows down again to the bath of 80° C. This 80° C. hot bath steam condensation test was carried out for three days. The solar reflectance retention before and after the test was measured.

In the hot bath steam condensation test, the resin film on the substrate is constantly exposed to fresh steam and its condensation during the test, such being severer test conditions than the constant temperature and humidity test.

(Accelerated Weathering Test)

An accelerated weathering test for 5,000 hours was carried out by using a sunshine weather meter (300 Sunshine Weather Meter, manufactured by Suga Test Instruments Co., Ltd.) equipped with a carbon arc lamp conforming to JIS K7350-4 (2008). The accelerated weathering test was carried out with respect to top print exposure where light is incident from the resin film side, and back print exposure where light is incident from the substrate side. After the accelerated weathering test, solar radiation reflectivity of the laminate and adhesion to the substrate were measured.

Deterioration due to top print exposure starts from the surface of the resin film. When aluminum particles are dissolved by penetration of water or an acid, they flow down with water from outside, whereby the surface layer of the resin film becomes brittle. Thus, by such deterioration due to top print exposure, decrease in the solar reflectance is observed at an early stage, and at the same time, cohesive failure of the resin film occurs in the cellophane tape peeling test.

On the other hand, in the case of the back print exposure, water from outside will not be directly in contact to the resin film, whereby, as compared with the case of the top print exposure where water is directly in contact, dissolution of the aluminum particles is considered to be less likely to take place. However, the interface between the resin film and the substrate, is irradiated with light which comes without passing through the resin film, whereby in addition to deterioration such as cracks of the resin film, adhesion at the interface is likely to be lowered, and the resin film and the substrate are likely to be peeled off. These degradations can be evaluated by whether or not interfacial peeling occurs in the cellophane tape peeling test.

Ex. 1 to 21

(Preparation of Fluorinated Resin Composition)

So that the composition would be as shown in Tables 2 and 3, a solution of first fluorinated polymer, a composite particle paste and a liquid medium (amount shown in upper column) were mixed and stirred to obtain a silver-colored paste. Further, for the purpose of viscosity control, a mixed solvent (amount shown in lower column: 60 g) of toluene/methyl ethyl ketone (MEK)=50/50 (mass ratio) was added to obtain a fluorinated resin composition having a Zahn cup No. 3 viscosity of 25 seconds.

Here, as the solution of first fluorinated polymer, "Lumiflon 200MEK" (trade name, manufactured by Asahi Glass Co., Ltd., solid content: 60 mass %, solvent: MEK) was used.

(Production of Laminate)

An ETFE film having a thickness of 200 μm (Fluon ETFE 55AXP (manufactured by Asahi Glass Co., Ltd.) was formed into a film), was subjected to corona discharge treatment in air at a treatment density of 150 W·min/m². On this treated surface (surface tension: 0.054 N/m), the above fluorinated resin composition was applied by a gravure printing method to form a coating film, so that the thickness after drying would be 3 μm, followed by drying at 100° C. for 20 seconds, to obtain a laminate having a resin film formed on the EFTE film as the substrate.

With respect to the obtained laminate, the initial evaluations (adhesion to substrate, solar reflectance) and the reliability tests (85° C.×85% RH constant temperature and humidity test, 80° C. hot bath steam condensation test, and accelerated weathering test), were, respectively, conducted, and the results are shown in Tables 2 and 3.

TABLE 2

| | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Composition | Composite particle paste | Type | (1) | (2) | (2) | (3) | (3) | (3) | (4) | (4) | (5) | (6) |
| | | Amount (g) | 28.5 | 28.5 | 25.9 | 28.5 | 25.9 | 23.0 | 28.5 | 25.9 | 28.5 | 25.0 |
| | Solution of first fluorinated polymer (g) | | 63.7 | 63.7 | 67.0 | 63.7 | 67.0 | 67.0 | 63.7 | 67.0 | 63.7 | 67.2 |
| | Medium (g) | Toluene/MEK = 1/1 | 7.8 | 7.8 | 7.1 | 7.8 | 7.1 | 7.0 | 7.8 | 7.1 | 7.8 | 7.8 |
| | | Toluene/MEK = 1/1 | 60 | 60 | 60 | 60 | 60 | 60 | 60 | 60 | 60 | 60 |
| Coating film layer | Content of aluminum particles (mass %) | | 31.2 | 28.1 | 25.3 | 24.2 | 21.7 | 20.8 | 21.7 | 18.9 | 23.4 | 26.6 |
| | Content of composite particles (mass %) | | 31.2 | 29.2 | 26.3 | 27.1 | 24.3 | 23.3 | 27.1 | 23.6 | 26.9 | 27.5 |
| | First fluorinated polymer/aluminum particles (mass ratio) | | 2.2 | 2.5 | 2.9 | 3.0 | 3.5 | 3.7 | 3.4 | 4.0 | 3.1 | 2.7 |
| Initial properties | Adhesion to substrate | | ◯ | ◯ | ◯ | ◯ | ◯ | ◯ | ◯ | ◯ | Δ | ◯ |
| | Solar reflectance (%) | | 68.8 | 66.5 | 64.1 | 62.1 | 61.5 | 59.4 | 54.3 | 52.3 | 63.3 | 58.7 |
| Reliability tests | 85° C. × 85% RH constant temperature and humidity test | Solar reflectance retention (%) | 78 | 100 | 98 | 98 | 100 | 100 | 98 | 100 | 100 | 100 |
| | 80° C. hot bath steam condensation test | Solar reflectance retention (%) | 10 | 34 | 40 | 97 | 96 | 95 | 100 | 100 | 100 | 56 |
| | Top print exposure | Solar reflectance | 30 | 82 | 84 | 86 | 85 | 86 | 90 | 90 | 92 | 70 |

TABLE 2-continued

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| accelerated weathering test | retention (%) Adhesion to substrate | Δ | ○ | ○ | ○ | ○ | ○ | ○ | ○ | Δ | ○ |
| Back print exposure accelerated weathering test | Solar reflectance retention (%) | 65 | 88 | 86 | 88 | 88 | 88 | 90 | 92 | 96 | 82 |
|  | Adhesion to substrate | ○ | ○ | ○ | ○ | ○ | ○ | ○ | ○ | Δ | ○ |

TABLE 3

|  |  |  | Ex. 11 | Ex. 12 | Ex. 13 | Ex. 14 | Ex. 15 | Ex. 16 | Ex. 17 | Ex. 18 | Ex. 19 | Ex. 20 | Ex. 21 |
|---|---|---|---|---|---|---|---|---|---|---|---|---|---|
| Composition | Composite particle paste | Type | (6) | (6) | (7) | (8) | (8) | (9) | (10) | (10) | (11) | (11) | (12) |
|  |  | Amount (g) | 28.5 | 23.0 | 28.5 | 28.5 | 23.0 | 28.5 | 28.5 | 23.0 | 28.5 | 23.0 | 28.5 |
|  | Solution of first fluorinated polymer (g) |  | 63.7 | 70.0 | 63.7 | 63.7 | 70.0 | 63.7 | 63.7 | 70.0 | 63.7 | 70.0 | 63.7 |
|  | Medium (g) | Toluene/MEK = 1/1 | 7.8 | 7.0 | 7.8 | 7.8 | 7.0 | 7.8 | 7.8 | 7.0 | 7.8 | 7.0 | 7.8 |
|  |  | Toluene/MEK = 1/1 | 60 | 60 | 60 | 60 | 60 | 60 | 60 | 60 | 60 | 60 | 60 |
| Coating film layer | Content of aluminum particles (mass %) |  | 30.4 | 24.3 | 23.6 | 26.7 | 20.7 | 23.7 | 26.3 | 21 | 24.3 | 20.9 | 26.1 |
|  | Content of composite particles (mass %) |  | 31.4 | 25.1 | 27.1 | 28.3 | 21.9 | 25.1 | 29.5 | 23.5 | 27.2 | 23.4 | 27.1 |
| First fluorinated polymer/aluminum particles (mass ratio) |  |  | 2.3 | 3.1 | 3.1 | 2.7 | 3.8 | 3.2 | 2.7 | 3.6 | 3.0 | 3.7 | 2.8 |
| Initial properties | Adhesion to substrate |  | ○ | ○ | ○ | ○ | ○ | ○ | ○ | ○ | ○ | ○ | ○ |
|  | Solar reflectance (%) |  | 61 | 57.5 | 52.8 | 68.2 | 63.4 | 62.7 | 46.3 | 42.3 | 70.1 | 66.1 | 47.1 |
| Reliability tests | 85° C. × 85% RH constant temperature and humidity test | Solar reflectance retention (%) | 97 | 98 | 100 | 100 | 99 | 99 | 98 | 99 | 100 | 100 | 100 |
|  | 80° C. hot bath steam condensation test | Solar reflectance retention (%) | 62 | 62 | 82 | 88 | 88 | 90 | 90 | 98 | 67 | 55 | 78 |
|  | Top print exposure accelerated weathering test | Solar reflectance retention (%) | 76 | 77 | 88 | 80 | 82 | 87 | 86 | 85 | 56 | 62 | 84 |
|  |  | Adhesion to substrate | ○ | ○ | ○ | ○ | ○ | ○ | ○ | ○ | Δ | Δ | ○ |
|  | Back print exposure accelerated weathering test | Solar reflectance retention (%) | 84 | 81 | 92 | 84 | 86 | 94 | 88 | 89 | 66 | 70 | 86 |
|  |  | Adhesion to substrate | ○ | ○ | ○ | ○ | ○ | ○ | ○ | ○ | Δ | Δ | ○ |

Laminates in Ex. 4 to 9 and 13 to 16 wherein a fluorinated resin composition of the present invention was used, were excellent in solar reflectance, and, in each of the reliability tests, were excellent in solar reflectance retention and excellent also in moist heat resistance.

On the other hand, the laminate in Ex.1 obtained by using aluminum particles having an acrylic resin or silica not coated, was insufficient in solar reflectance retention in each of the reliability tests. The laminates in Ex. 17, 18 and 21 obtained by using the composite particles having a water surface diffusion area of less than 14,000 cm²/g had low initial solar reflectance. The laminates in Ex. 19 and 20 obtained by using composite particles having a water surface diffusion area exceeding 27,000 cm²/g, were not able to accomplish a sufficient solar reflectance retention in the 80° C. hot bath steam condensation test and the accelerated weathering test. The laminates in Ex. 2, 3, 10 to 12 and 21 obtained by using composite particles wherein the content of the acrylic resin was less than 6 parts by mass per 100 parts by mass of the aluminum particles, were not able to accomplish sufficient solar reflectance retention in the 80° C. hot bath steam condensation test.

REFERENCE SYMBOLS

10: laminate, 12: substrate, 14: resin film, 20: incident light

INDUSTRIAL APPLICABILITY

The fluorinated resin composition of the present invention is capable of forming, in addition to a film material for a film structure building, a resin film suitable as a building member, such as building exterior wall, roofing material, skylight, greenhouse, arcade, waterproof sheet, building curing sheet, etc. The laminate of the present invention is applicable to, in addition to a film member for a film structure building, a building member, such as building exterior wall, roofing material, skylight, greenhouse, arcade, waterproof sheet, building curing sheet, etc.

This application is a continuation of PCT Application No. PCT/JP2015/059979, filed on Mar. 30, 2015, which is based upon and claims the benefit of priority from Japanese Patent Application No. 2014-071593 filed on Mar. 31, 2014. The contents of those applications are incorporated herein by reference in their entireties.

What is claimed is:

1. A fluorinated resin composition comprising:
composite particles comprising aluminum particles and at least one coating material selected from the group consisting of an acrylic resin and silica, a part or whole of the surface of the aluminum particles being coated with the at least one coating material;
a fluorinated polymer; and
a liquid medium, wherein the total coating amount of the at least one coating material is from 6 to 25 parts by mass per 100 parts by mass of the aluminum particles, and the water surface diffusion area of the composite particles is from 14,000 to 24,000 cm$^2$/g.

2. The fluorinated resin composition according to claim 1, wherein the fluorinated polymer is at least one member selected from the group consisting of a tetrafluoroethylene-hexafluoropropylene-vinylidene fluoride copolymer and a fluorinated polymer having hydroxyl groups.

3. The fluorinated resin composition according to claim 1, wherein the content of the composite particles is from 10 to 35 mass % in the solid content of the fluorinated resin composition.

4. The fluorinated resin composition according to claim 1, wherein the content of the fluorinated polymer is from 90 to 65 mass % in the solid content of the fluorinated resin composition.

5. The fluorinated resin composition according to claim 1, wherein the mass ratio of the fluorinated polymer to the aluminum particles is from 1 to 4.

6. A resin film which is a dried product of the fluorinated resin composition as defined in claim 1.

7. The resin film according to claim 6, wherein the resin film comprises the composite particles and the fluorinated polymer, and is disposed on a substrate comprising a second fluorinated polymer.

8. A laminate comprising:
a substrate comprising a second fluorinated polymer; and
a resin film disposed at least at a partial region on the substrate, wherein the resin film is a dried product of the fluorinated resin composition as defined in claim 1.

9. The laminate according to claim 8, wherein the second fluorinated polymer is at least one member selected from the group consisting of a vinyl fluoride polymer, a vinylidene fluoride polymer, a vinylidene fluoride-hexafluoropropylene copolymer, a tetrafluoroethylene-hexafluoropropylene-vinylidene fluoride copolymer, a tetrafluoroethylene-propylene copolymer, a tetrafluoroethylene-vinylidene fluoride-propylene copolymer, an ethylene-tetrafluoroethylene copolymer, a hexafluoropropylene-tetrafluoroethylene copolymer, an ethylene-hexafluoropropylene-tetrafluoroethylene copolymer and a perfluoro(alkyl vinyl ether)-tetrafluoroethylene copolymer.

10. The laminate according to claim 8, wherein the thickness of the resin film is from 1 to 5 μm.

11. The laminate according to claim 8, wherein the surface tension of a region on the substrate where the resin film is disposed, is at least 0.035 N/m.

12. The laminate according to claim 8, which is a film material for a film-structure building.

13. The laminate according to claim 8, wherein the resin film is formed by a printing method.

14. A laminate comprising:
a resin film which comprises coated aluminum particles and a first fluorinated polymer;
a substrate comprising a second fluorinated polymer, the resin film being disposed at least at a partial region on the substrate,
wherein the thickness of the resin film is from 1 to 5 μm,
the solar reflectance of the resin film is at least 50%,
the coated aluminum particles comprise aluminum particles and at least one coating material selected from the group consisting of an acrylic resin and silica, a part or whole of the surface of the aluminum particles being coated with the at least one coating material selected from the group consisting of an acrylic resin and silica,
the total coating weight of the coating material is from 6 to 25 parts by weight per 100 parts by weight of the aluminum particles, and
the water surface diffusion area of the coated aluminum particles is from 14,000 to 24,000 cm$^2$/g.

15. The fluorinated resin composition according to claim 1, wherein the water surface diffusion area of the composite particles is from 16,000 to 20,000 cm$^2$/g.

16. The fluorinated resin composition according to claim 1, wherein the liquid medium does not contain water.

17. The fluorinated resin composition according to claim 1, wherein the liquid medium is at least one member selected from the group consisting of an aromatic hydrocarbon solvent, a ketone solvent, an alcohol solvent, an ether solvent and an amide solvent.

18. The laminate according to claim 14, wherein the water surface diffusion area of the coated aluminum particles is from 16,000 to 20,000 cm$^2$/g.

19. The laminate according to claim 14, wherein the resin film is a dried product of a fluorinated resin composition which comprises the coated aluminum particles, the first fluorinated polymer, and a liquid medium which does not contain water.

20. The laminate according to claim 14, wherein the resin film is a dried product of a fluorinated resin composition which comprises the coated aluminum particles, the first fluorinated polymer, and a liquid medium which is at least one member selected from the group consisting of an aromatic hydrocarbon solvent, a ketone solvent, an alcohol solvent, an ether solvent and an amide solvent.

* * * * *